United States Patent [19]
Sherman

[11] 4,045,131
[45] Aug. 30, 1977

[54] SPECTACLE FRAMES

[76] Inventor: Jack Sherman, 1 The Hollows, Syosset, N.Y. 11791

[21] Appl. No.: 627,540

[22] Filed: Oct. 31, 1975

[51] Int. Cl.² ............................................. G02C 11/02
[52] U.S. Cl. ...................................... 351/52; 351/51; 351/105
[58] Field of Search ..................... 351/51, 52, 104, 105

[56] References Cited
U.S. PATENT DOCUMENTS

| 2,682,724 | 7/1954 | Pattillo | 351/52 |
| 2,778,136 | 1/1957 | Belgard | 351/52 |
| 2,803,994 | 8/1957 | DeAngelis et al. | 351/52 |

FOREIGN PATENT DOCUMENTS

| 776,780 | 6/1957 | United Kingdom | 351/51 |

*Primary Examiner*—Saxfield Chatmon, Jr.

[57] ABSTRACT

Means in the shape and configuration of letters of the alphabet, words or animals adapted to be affixed to form eyeglass frames as an ornamental piece.

5 Claims, 3 Drawing Figures

SPECTACLE FRAMES

BACKGROUND OF THE INVENTION

This invention relates to ornamental novelty means adapted to be part of eyeglass frames. More particularly, to means that are in the form of letters, words or animals or any other suitable shape.

The prior art describes many types of eyeglass frames, for example, those disclosed in U.S. Pat. Nos. 2,682,724; 2,835,063; 2,743,543; 2,868,043; 2,868,043; 3,034,401; 3,179,950; 3,526,450; and others. The foregoing, however, do not provide for an ornamental attachment as is herein contemplated.

SUMMARY OF THE INVENTION

It is accordingly an object of the instant invention to provide for an improved eye glass frame having ornamental means thereon.

It is another object to provide for the same at relatively little cost thereby making the same generally available.

It is a further object to provide for removable means.

These and other objects and advantages of the invention will become more apparent from the following detailed disclosure and claims, and by reference to the accompanying drawings, in which:

Figure 1:
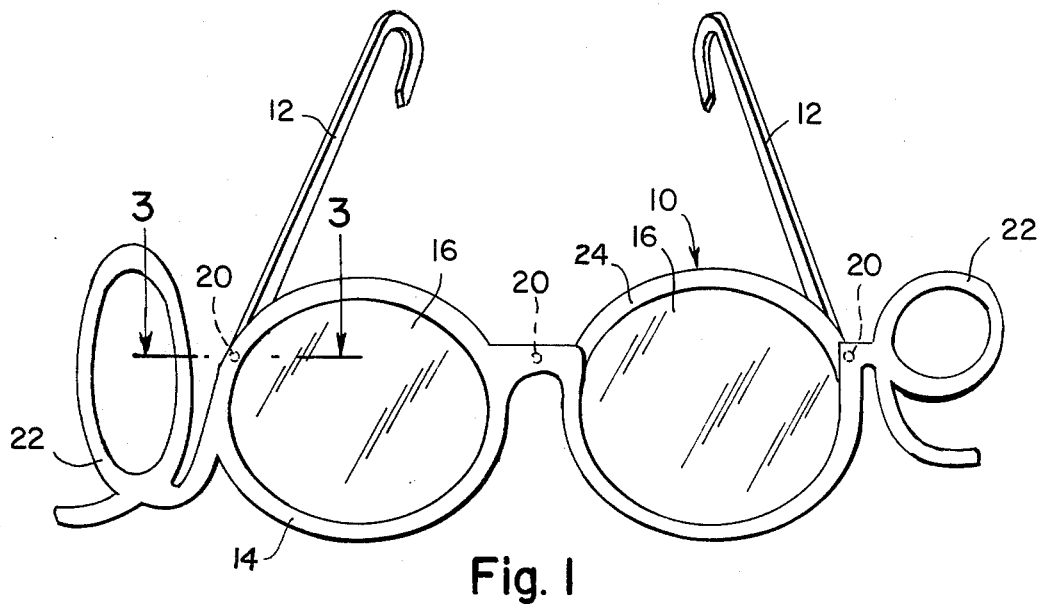
FIG. 1 is a front elevational view of the means and frames.
Figure 2:
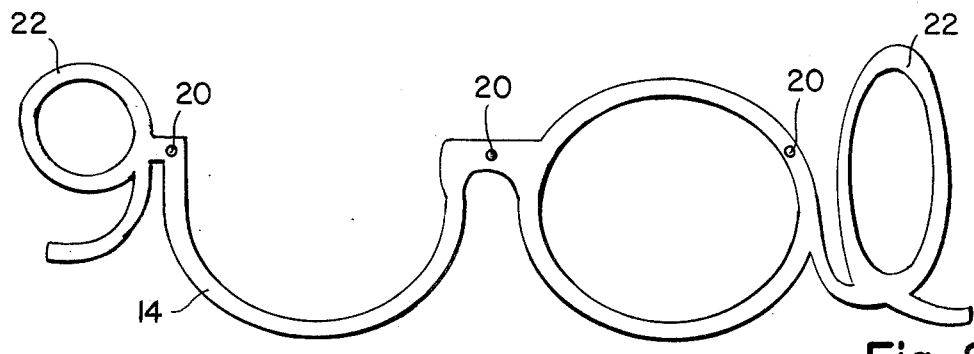
FIG. 2 is a rear elevational view of part of the means.
Figure 3:
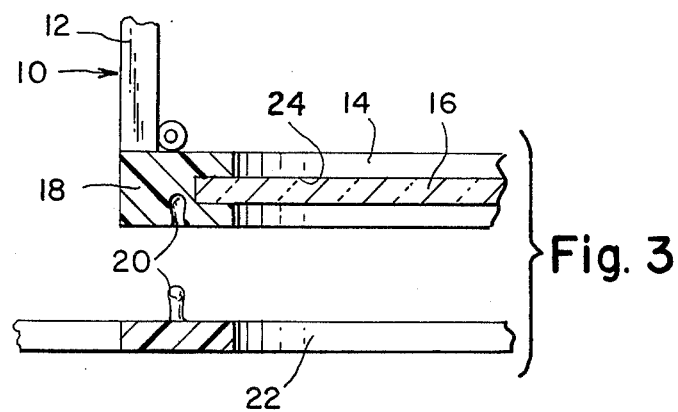
FIG. 3 is a sectional view taken along the line 3—3 of FIG. 1.

Broadly speaking, the instant invention includes the provision of an eyeglass frame comprising a frame portion including a pair of rim sections adapted to receive a lens therein; a pair of temples, one lateral side of each of the rims including first mean for engaging lettered ornament thereon, the lettered ornament including second means adapted to compliment the first means whereby the ornament is removably affixed to the rim, the rim portion being in the shape of at least one letter of the alphabet, the combination of the pair of rims and the ornamental letters forming a word.

DETAILED DISCLOSURE

Referring more particularly to the drawings, there is shown an eyeglass frame 10 that in one embodiment may be a conventional frame having a pair of side positions or temples 12 and rims 14 that are adapted to receive the lenses 16 therein. In this embodiment a lateral end 18 section of each rim 14 is provided with means 20 such as one member of a snap (male and female portions) that is adapted to receive and engage a complimentary means 20 on the ornament is adapted to be removably affixed to the rim 14. The ornament 22 may be in the shape of the letters of the alphabet as is shown, or a word or an animal figure. If desired, each ornamental letter 22 may also contain affixing means 20 for attaching one to the other to make a word.

In a further embodiment there is comtemplated the frame 10 already in the form of a word, such that there is only needed a channeled area 24 to accommodate insertion of the lenses 16 therein, such as one channeled area 24 in each of two adjacent letters of the alphabet. A cover or top section 26 also having a channel 24 will then be placed over the inserted lens 16 and snapped into place by suitable means 20. An area will be provided on two of the letter to affix the temples 12 thereto.

Since it is obvious that numerous changes and modifications can be made in the above-described details without departing from the spirit and nature of the invention, it is to be understood that all such changes and modifications are included within the scope of the invention.

What is claimed is:

1. An eyeglass frame comprising a frame portion including a pair of rim sections adapted to receive a lens therein; a pair of temples, one lateral side of each of said rim sections including first means for engaging a lettered ornament thereon, said lettered ornament including second means adapted to cooperate with said first means whereby said ornament is removably affixed to said rim, each of said rim sections being in the shape of at least one letter of the alphabet, said lettered ornament depending from said rim sections in planar alignment therewith and extending across the face thereof thereby increasing the longitudinal breadth of said frame beyond that defined between said rim sections and said temples whereby said combination of said pair of rims and said ornamental letters forming a word.

2. The frame as defined in claim 1 wherein said means include a male and female snap.

3. The frame as defined in claim 1 wherein said rim sections are substantially arcuate shaped and discontinuous whereby a lens may be inserted therein.

4. The frame as defined in claim 3 wherein said rim section further includes a member adapted to engage said discontinuous portion thereby forming a continuous rim portion.

5. In combination, a conventionally shaped eyeglass frame having rim sections defining an area for receiving a lens therein, a pair of temples adjacent each of said rim sections, and means for connecting said temples to said rim sections, the improvement comprising, a planar structure having a plurality of continuous arcuate shaped sections, said plurality of sections forming a word, said structure engaging said frame across the front portion thereof without obstructing the area defined between each of said rim sections, said structure extending beyond a point of contact between said rim sections and said temples, second means disposed on one surface of eaid structure for engaging said rim sections whereby said structure is removably attachable thereto.

* * * * *